(12) United States Patent
Drennen et al.

(10) Patent No.: US 9,359,069 B2
(45) Date of Patent: Jun. 7, 2016

(54) APPARATUS AND SYSTEM FOR AIRCRAFT PARK BRAKE SYSTEMS

(71) Applicant: Goodrich Corporation, Charlotte, NC (US)

(72) Inventors: David Drennen, Bellbrook, OH (US); Kevin Rehfus, Troy, OH (US); Robert French, Beavercreek, OH (US); Albert Keith Pant, Carlisle, OH (US); Joseph E. Beason, Kettering, OH (US); Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/454,377

(22) Filed: Aug. 7, 2014

(65) Prior Publication Data

US 2016/0039520 A1 Feb. 11, 2016

(51) Int. Cl.
*B60L 7/00* (2006.01)
*B64C 25/44* (2006.01)
*F16D 65/12* (2006.01)
*F16D 65/18* (2006.01)
*F16D 59/02* (2006.01)
F16D 121/20 (2012.01)
F16D 127/06 (2012.01)

(52) U.S. Cl.
CPC .............. *B64C 25/44* (2013.01); *F16D 59/02* (2013.01); *F16D 65/12* (2013.01); *F16D 65/183* (2013.01); *F16D 65/186* (2013.01); F16D 2121/20 (2013.01); F16D 2127/06 (2013.01)

(58) Field of Classification Search
CPC ............ F16D 2125/40; F16D 2127/06; F16D 2129/08; F16D 65/186; F16D 2121/22; F16D 55/02; F16D 59/02

USPC .......... 188/156, 157, 158, 161, 163, 164, 171
See application file for complete search history.

(56) References Cited

U.S. PATENT DOCUMENTS

| | | | |
|---|---|---|---|
| 5,185,542 A | 2/1993 | Lazorchak | |
| 6,269,917 B1 * | 8/2001 | Harting | F16D 55/02 188/161 |
| 7,063,190 B1 * | 6/2006 | Sylvan | F16D 65/186 188/161 |
| 7,347,305 B2 * | 3/2008 | Klode | B60T 13/02 188/161 |
| 2005/0109568 A1 | 5/2005 | Ether | |
| 2010/0210391 A1 | 8/2010 | Dinger | |

FOREIGN PATENT DOCUMENTS

| | | |
|---|---|---|
| EP | 1679242 | 7/2006 |
| EP | 2466164 | 6/2012 |
| FR | 2975151 | 11/2012 |

OTHER PUBLICATIONS

Extended European Search Report dated Dec. 15, 2015 in European Application No. 15179529.1.

* cited by examiner

*Primary Examiner* — Thomas J Williams
*Assistant Examiner* — Mariano Sy
(74) *Attorney, Agent, or Firm* — Snell & Wilmer, LLP

(57) ABSTRACT

An electro-mechanical actuator including an aircraft parking brake may include a motor shaft, a park brake disk, and a voice coil assembly. The voice coil assembly may include a bobbin configured to translate between an engaged position and a disengaged position. An engagement feature may be coupled to the bobbin. The engagement feature may contact the park brake disk in the engaged position. The engagement feature may be magnetically coupled to a voice coil magnet and washer in the disengaged position.

14 Claims, 6 Drawing Sheets

APPARATUS AND SYSTEM FOR AIRCRAFT PARK BRAKE SYSTEMS

FIELD

The present disclosure relates to aircraft brake systems, and more particularly, to aircraft park brake systems.

BACKGROUND

An aircraft brake system may include a park brake. The park brake may prevent the wheels of the aircraft from turning. Existing park brakes may include friction disk which is clamped via a spring between the brake housing and a steel armature plate. The armature plate can be manipulated by providing an electrical current pulse to an electro-magnet and permanent magnet assembly in order to either attract and hold the armature plate away from the friction disk or release the armature plate and clamp the friction disk.

SUMMARY

In various embodiments, an electro-mechanical actuator ("EMA") may comprise a motor shaft, a park brake disk, and a voice coil assembly. The park brake disk may be coupled to the motor shaft. The voice coil assembly may comprise an engagement feature configured to contact the park brake disk.

In various embodiments, a system for locking an aircraft brake may comprise a motor shaft, a park brake disk coupled to the motor shaft, a voice coil magnet located around the motor shaft, a steel washer located around the motor shaft and adjacent to the voice coil magnet, a bobbin, and an engagement feature. The bobbin may comprise an inner cylinder, an outer cylinder, and a bobbin disk. The engagement feature may be coupled to the bobbin disk. The bobbin may be translatable between an engaged position and a disengaged position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an aircraft brake system may comprise a brake system controller ("BSC") coupled to one or more electro-mechanical actuator controllers ("EMACs"), which may drive an electro-mechanical actuator ("EMA"). The BSC may be in communication with a brake pedal, and thus may control the EMACs in accordance with pilot/copilot braking commands. For example, brake pedal deflection may be indicative of pilot/copilot braking commands. The EMA may be coupled to or otherwise operate a pressure generating device, such as, for example, a ball screw, a ram, and/or the like. In operation, the EMA may cause the pressure generating device to move and/or exert a force on other brake system structures, such as a brake disk or pad to exert a force that restrains rotation of a wheel or other suitable moving structure. This stopping force may load and/or exert a corresponding force on the EMA structures such as, for example, an EMA housing.

Figure 1:
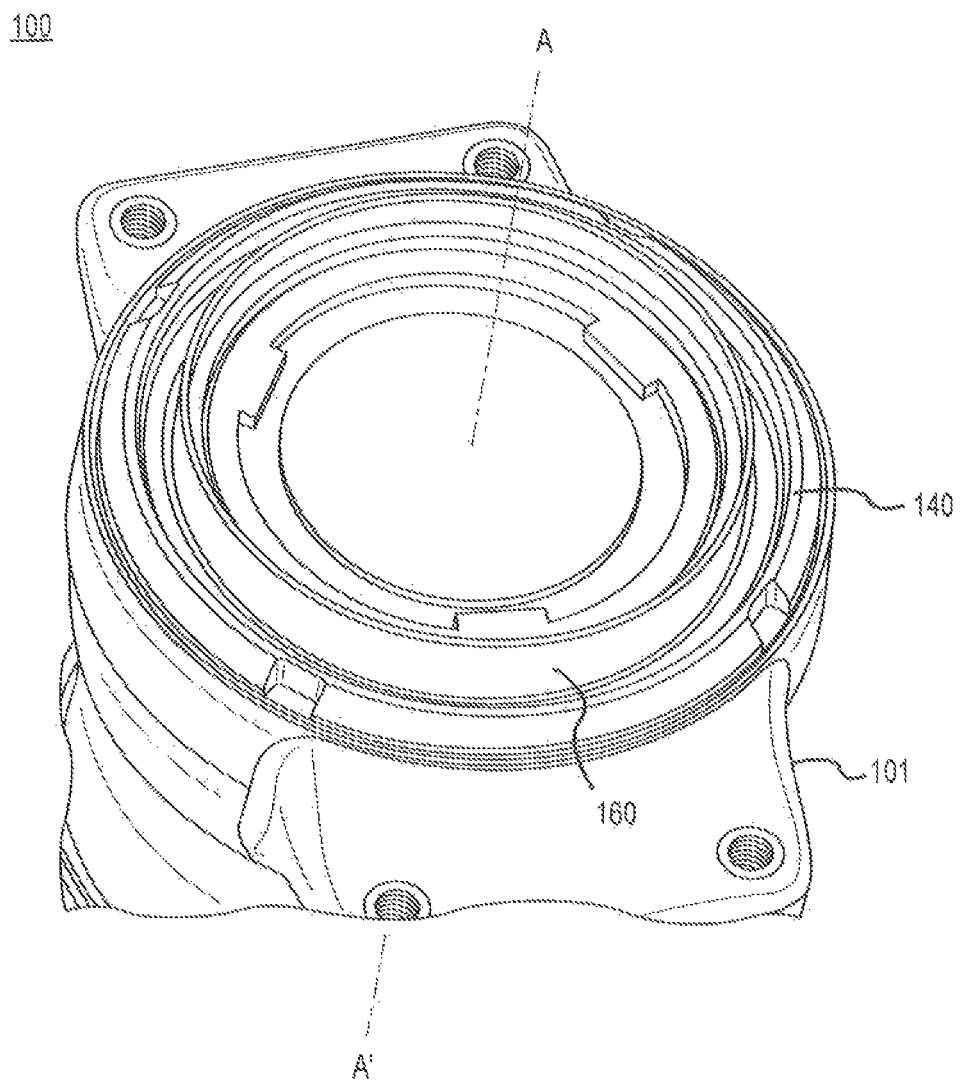
FIG. 1 illustrates a perspective view of an electro-mechanical actuator ("EMA"), in accordance with various embodiments.

Referring to FIG. 1, a perspective view of an EMA 100 is shown. The EMA may extend along the axis marked A-A', with A being located near a distal portion of EMA 100 and A' being near a proximal portion of EMA 100. The EMA 100 may, as described above, be involved in the application of a braking force to an aircraft wheel. The EMA 100 assembly may comprise an EMA housing 101, which may extend along the axis A-A'. The EMA housing 101 may house a variety of components, including, for example, a ball nut 140, a ball screw 160, and a motor drive unit. Generally, the motor drive unit may drive the ball screw 160 through a plurality of rotations. As the ball screw 160 rotates, the ball nut 140 may translate distally and/or proximally along the axis A-A' (depending upon the direction of rotation of the ball screw 60). The ball nut 140 may be coupled to a disc or "puck," at a distal end thereof. The puck may exert a pressure against a brake stack coupled to an aircraft wheel to impede or halt a rolling motion of the wheel. The EMA may include a bi-stable park brake. For example, the EMA may comprise a park brake system (as described below with reference to FIGS. 2-6).

A brake may be used to prevent an EMA from rotating the ball screw in a first state, while permitting rotation of the ball screw in a second state. Prevention of ball screw rotation may be advantageous in a parking brake mode. A bi-stable brake may be switched from one state to another. After reaching either state, the state may be maintained without any additional energy input.

Figure 2:
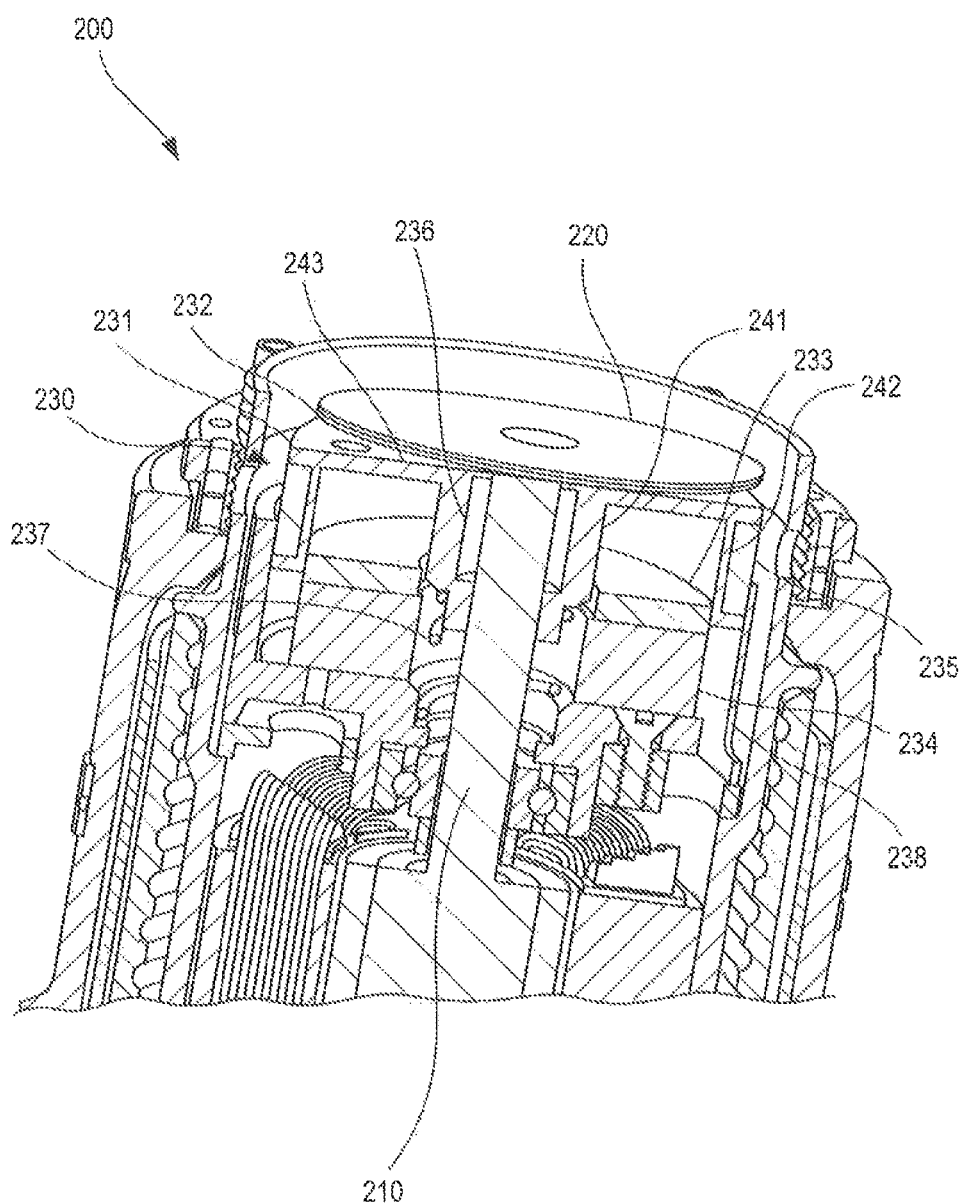
FIG. 2 illustrates a section view of an EMA including a magnetic disk park brake in an engaged position, in accordance with various embodiments.

Referring to FIG. 2, a section view of an EMA 200 with a magnetic disk park brake is illustrated according to various embodiments. EMA 200 may comprise a motor shaft 210. The motor shaft 210 may rotate the ball screw in the actuator to transform the rotary motion of the ball screw into linear motion of the ball nut. A park brake disk 220 may be coupled to the motor shaft 210. The park brake disk 220 may be magnetic. The park brake disk 220 may be manufactured to comprise minimal mass to avoid increased rotational inertia, and may be constructed with over molded plastic or other suitable low mass materials while containing a metal ring (e.g., a steel ring) to engage an engagement feature.

The EMA 200 may comprise a voice coil assembly 230. The voice coil assembly 230 may comprise a bobbin 231, a bobbin magnet 232, a washer 233, a voice coil magnet 234, a copper wire 235, a plain bearing 236, a return spring 237, and a linear guide 238. The voice coil magnet 234 may be a disk surrounding the motor shaft 210. The washer 233 may be axially adjacent to the voice coil magnet 234 and surrounding the motor shaft 210. In various embodiments, the washer 233 may comprise steel and/or another ferromagnetic material. The voice coil magnet 234 may magnetize the washer 233.

The bobbin 231 may comprise an inner cylinder 241 located between the motor shaft 210 and the voice coil magnet 234. The bobbin 231 may comprise an outer cylinder 242 located between the voice coil magnet 234 and the linear guide 238. Bobbin 231 may further comprise a bobbin disk 243 extending between the inner cylinder 241 and the outer cylinder 242. The bobbin 231 may be configured to translate axially along motor shaft 210. Copper wire 235 may be wound around the outer cylinder 242. In response to a voltage being applied to the copper wire 235, a magnetic force may be applied to the copper wire 235 from the voice coil magnet 234 and the washer 233, causing the bobbin 231 to translate axially either toward or away from the washer 233, depending on the polarity of the voltage.

The bobbin magnet 232 may be coupled to the bobbin disk 243. The bobbin magnet 232 may be an engagement feature configured to contact the park brake disk 220. The bobbin magnet 232 may comprise a disk. As illustrated in FIG. 2, the EMA 200 is in the engaged position, in which the bobbin magnet 232 is magnetically coupled to the park brake disk 220. Friction between the bobbin magnet 232 and the park brake disk 220 may prevent park brake disk 220 and motor shaft 210 from rotating. Thus, EMA 200 may be in a locked position and may prevent the wheels of an aircraft from rotating.

Figure 3:
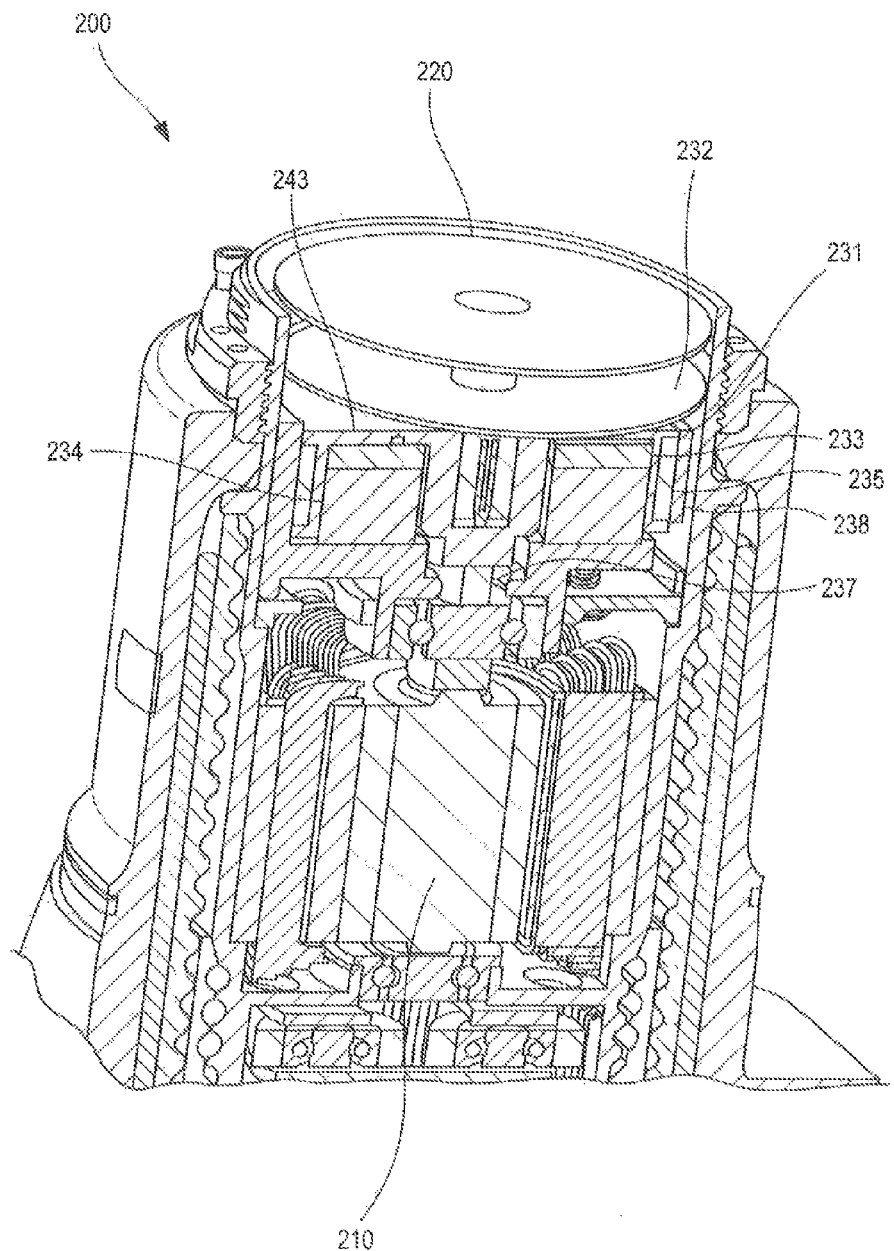
FIG. 3 illustrates a section view of an WA including a magnetic disk park brake in a disengaged position, in accordance with various embodiments.

A voltage may be applied to the copper wire 235 in order to disengage the park brake. In response to the voltage being applied to copper wire 235, a magnetic force between the copper wire 235 and the voice coil magnet 234 and the washer 233 may drive the bobbin 231 toward the washer 233. The force between the copper wire 235 and the voice coil magnet 234 and the washer 233 may be greater than the force between the bobbin magnet 232 and the park brake disk 220. This may separate the bobbin magnet 232 from the park brake disk 220 and cause the bobbin 231 to translate toward the washer 233 until the bobbin disk 243 contacts the washer 233, as shown in FIG. 3. The linear guide 238 may comprise anti-rotation guides which prevent the bobbin 231 from rotating.

Referring to FIG. 3, the EMA 200 is illustrated with the park brake in a disengaged position. The bobbin magnet 232 is axially separated from park brake disk 220. Thus, park brake disk 220 and motor shaft 210 may rotate, which may allow the aircraft wheels to rotate. The bobbin disk 243 may contact the washer 233, and the return spring 237 may be compressed. A magnetic force between the bobbin magnet 232 and the washer 233 and voice coil magnet 234 may be stronger than a three on the bobbin 231 from the return spring 237. Thus, the disengaged position may be a stable state, in which no additional energy is required to maintain the EMA 200 in the disengaged position.

In order to engage the parking brake, a voltage may be applied to the copper wire 235. The voltage to engage the parking brake may be opposite in polarity of the voltage to disengage the parking brake. The voltage may create a magnetic force between the copper wire 235 and the washer 233 and the voice coil magnet 234. The magnetic three from the copper wire 235 may be stronger than the magnetic force between the bobbin magnet 232 and the washer 233 and voice coil magnet 234. This may force the bobbin 231 to move within the linear guide 238 away from the washer 233 and toward the park brake disk 220 to the engaged position shown in FIG. 1. The return spring 237 may bias the bobbin 231 toward the park brake disk 220. Thus, the return spring 237 may provide additional force to drive the bobbin 231 toward the park brake disk 220. Once in the engaged position, the voltage may be eliminated, and the park brake may be in a stable state in the engaged position.

Figure 4:
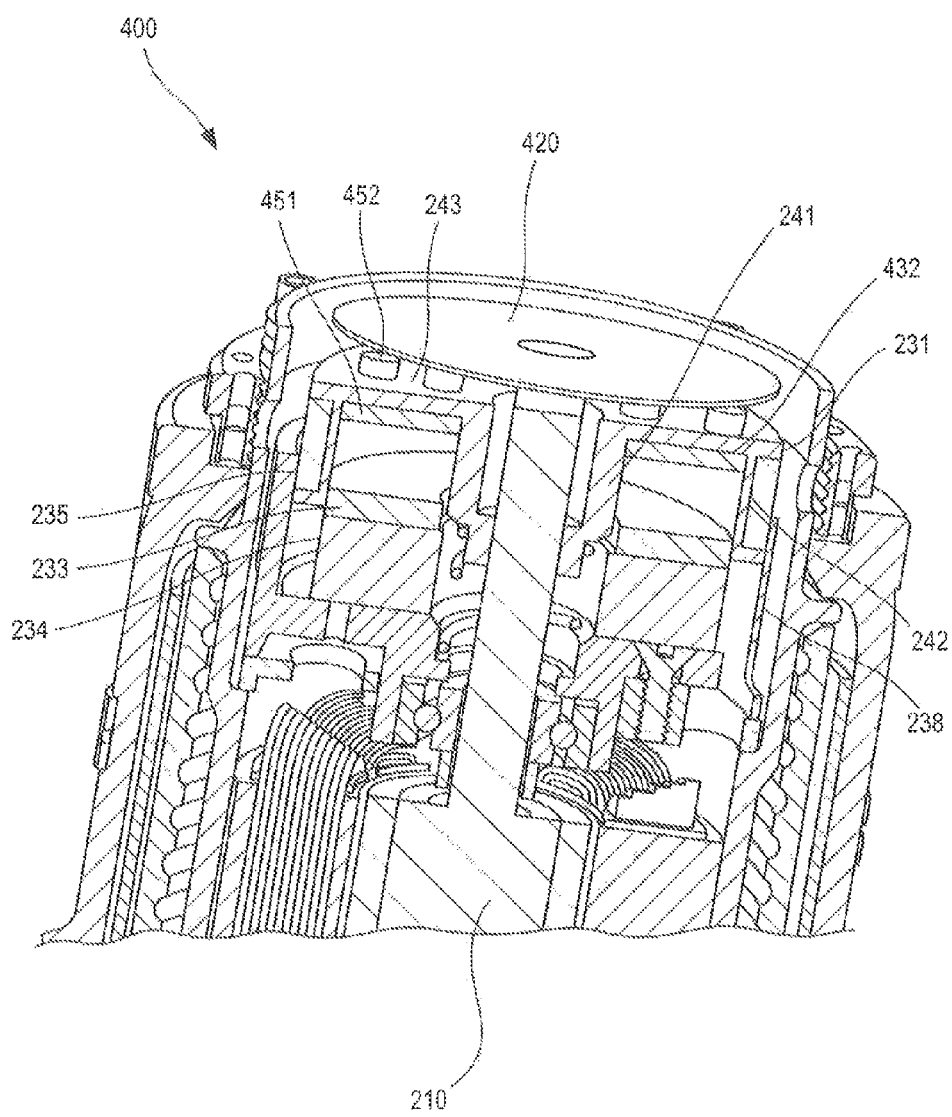
FIG. 4 illustrates a section view of an EMA including a bobbin insert in an engaged position, in accordance with various embodiments.

Referring to FIG. 4, an EMA 400 comprising a park brake with a bobbin insert 432 is illustrated in an engaged position according to various embodiments. The EMA 400 may be similar to the EMA 200 illustrated in FIGS. 2 and 3. However, EMA 400 may comprise a bobbin insert 432 in place of the bobbin magnet 232 of EMA 200. The bobbin insert 432 may comprise an insert disk 451 located between the inner cylinder 241 and the outer cylinder 242 of the bobbin 231 and adjacent to the bobbin disk 243. The bobbin insert 432 may further comprise one or more pins 452. The pins 452 may extend through apertures in bobbin disk 243. In the engaged position, return spring 237 may maintain a pressure on bobbin 231 which contacts park brake disk 420. Friction between the pins 452 and the park brake disk 420 may prevent park brake disk 420 and motor shaft 210 from rotating.

Figure 5:
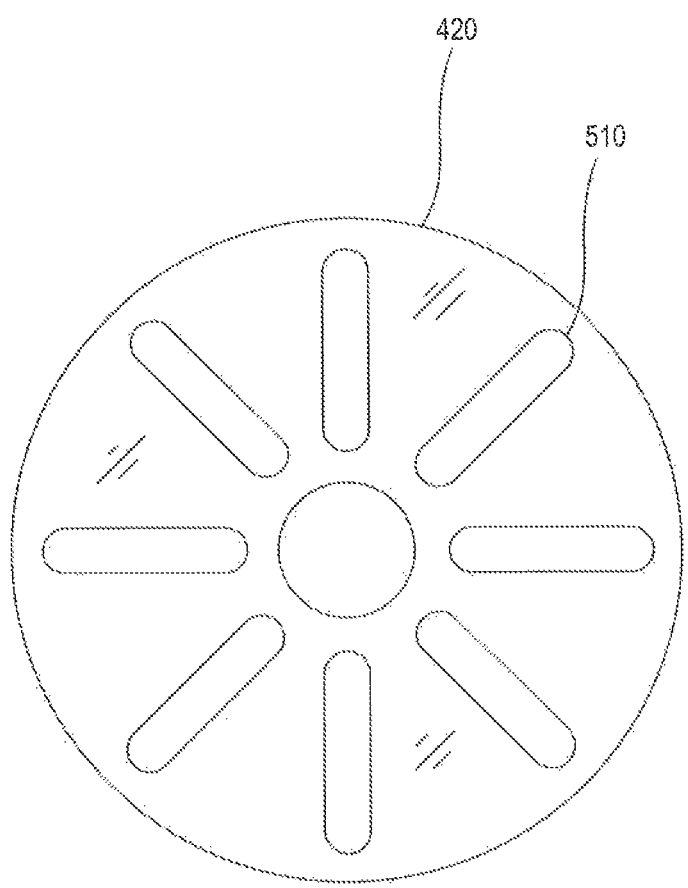
FIG. 5 illustrates a park brake disk, in accordance with various embodiments.

Referring to FIG. 5, a park brake disk 420 is illustrated according to various embodiments. The park brake disk 420 may comprise grooves 510. The pins 452 shown in FIG. 4 may be inserted into the grooves 510 to prevent the park brake disk 420 from rotating. In the event that the pins 452 initially contact the park brake disk 420 between the grooves 510, the park brake disk 420 may rotate until the pins 452 enter the grooves 510.

Referring back to FIG. 4, a voltage may be applied to the copper wire 235 in order to disengage the park brake. In response to the voltage being applied to the copper wire 235, a magnetic force between the copper wire 235 and the voice coil magnet 234 and the washer 233 may cause the bobbin 231 to move within the linear guide 238 toward the washer 233. The force between the copper wire 235 and the voice coil magnet 234 and the washer 233 may be greater than the force from the return spring 237. This may separate the pins 452 from the park brake disk 220 and cause the bobbin 231 to translate toward the washer 233 until the insert disk 451 contacts the washer 233, as shown in FIG. 6.

Figure 6:
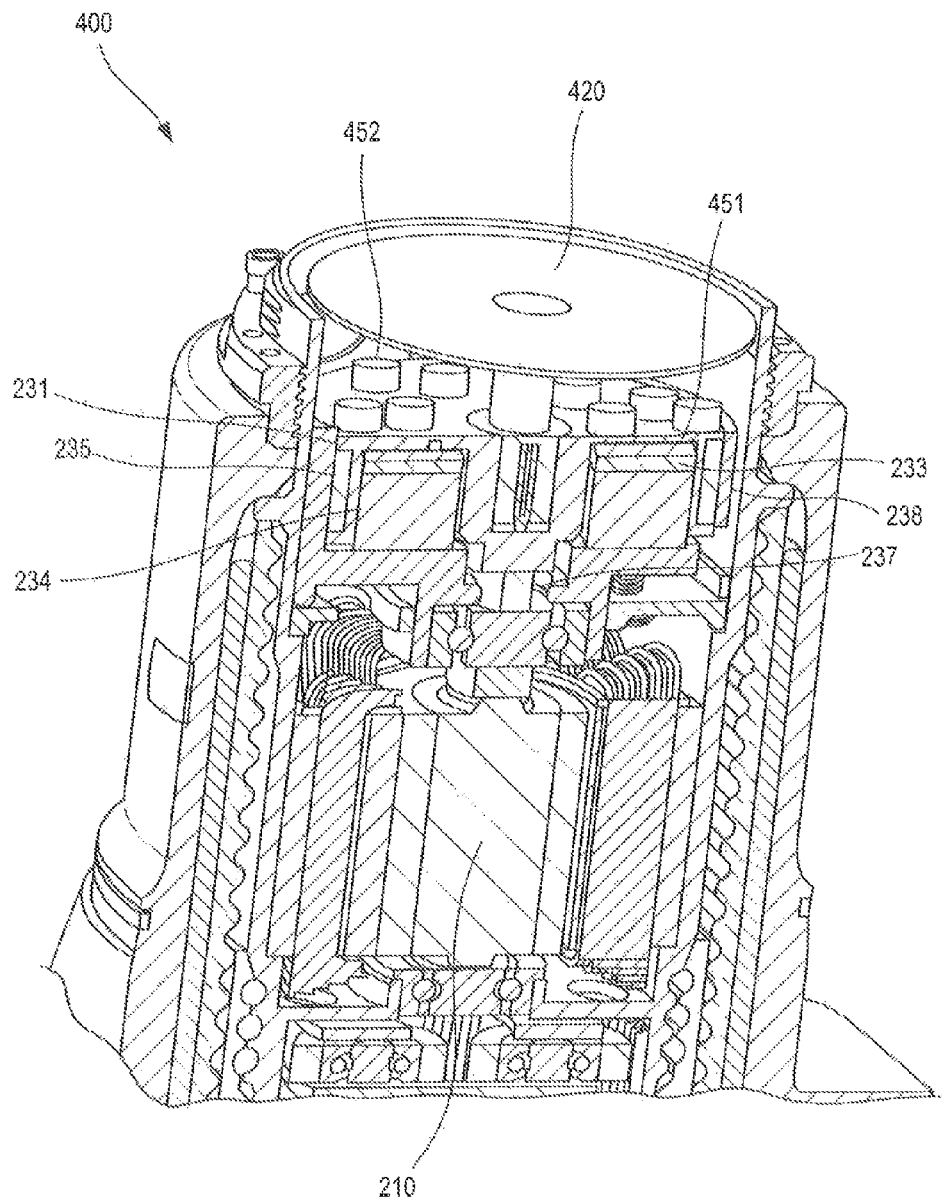
FIG. 6 illustrates a section view of an EMA including a bobbin insert in a disengaged position, in accordance with various embodiments.

Referring to FIG. 6, the EMA 400 is illustrated with the park brake in a disengaged position. The pins 452 are, separated from park brake disk 420. Thus, park brake disk 420 and motor shaft 210 may rotate, which may allow the aircraft wheels to rotate. The insert disk 451 may contact the washer 233, and the return spring 237 may be compressed. A magnetic force between the insert disk 451 and the washer 233 and voice coil magnet 234 may be stronger than a force on the bobbin 231 from the return spring 237. Thus, the disengaged position may be a stable state, in which no additional energy is required to maintain the EMA 400 in the disengaged position.

In order to engage the parking brake, a voltage may be applied to the copper wire 235. The voltage to engage the parking brake may be opposite in polarity of the voltage to disengage the parking brake. The voltage may create a magnetic force between the copper wire 235 and the washer 233 and the voice coil magnet 234. The magnetic force from the copper wire 235 may be stronger than the magnetic force between the insert disk 451 and the washer 233 and voice coil magnet 234. This may cause the bobbin 231 to move within the linear guide 238 away from the washer 233 and toward the park brake disk 220 to the engaged position shown in FIG. 4. The return spring 237 may provide additional force to drive the bobbin 231 toward the park brake disk 220. Once in the engaged position, the voltage may be eliminated, and the park brake may be in a stable state in the engaged position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements no expressly listed or inherent to such process, method, article, or apparatus.

What is claimed is:

1. An electro-mechanical actuator ("EMA") comprising:
a motor shaft;
a park brake disk coupled to the motor shaft; and
a voice coil assembly, the voice coil assembly comprising:
an engagement feature configured to contact the park brake disk;
a bobbin configured to translate along the motor shaft; and
a wire wound around the bobbin.

2. The EMA of claim 1, wherein the engagement feature comprises a bobbin magnet.

3. The EMA of claim 2, wherein the bobbin magnet comprises a magnetic disk coupled to the bobbin.

4. The EMA of claim 1, wherein the engagement feature comprises a bobbin insert coupled to a bobbin.

5. The EMA of claim 4, wherein the bobbin insert comprises an insert disk and a pin extending through an aperture in the bobbin.

6. The EMA of claim 1, further comprising a return spring configured to bias the bobbin toward the park brake disk.

7. The EMA of claim 1, wherein the voice coil assembly comprises an anti-rotation feature.

8. A system for locking an aircraft brake comprising:
a motor shaft;
a park brake disk coupled to the motor shaft;
a voice coil magnet located around the motor shaft;
a steel washer located around the motor shaft and adjacent to the voice coil magnet;
a bobbin comprising an inner cylinder, an outer cylinder, and a bobbin disk; and
an engagement feature coupled to the bobbin disk;
wherein the bobbin is translatable along the motor shaft between an engaged position and a disengaged position.

9. The system of claim 8, wherein, in the engaged position, the engagement feature is in contact with the park brake disk, and wherein, in the disengaged position, the engagement feature is magnetically coupled to the steel washer.

10. The system of claim 8, wherein the engagement feature comprises a bobbin magnet.

11. The system of claim 8, wherein the engagement feature comprises a bobbin insert comprising an insert disk and a pin.

12. The system of claim 8, wherein the park brake disk comprises a groove.

13. The system of claim 8, further comprising a copper wire wound around the outer cylinder.

14. The system of claim 13, wherein the bobbin is configured to translate in response to a voltage applied to the copper wire.

* * * * *